US006316532B1

(12) United States Patent
Nozaki et al.

(10) Patent No.: US 6,316,532 B1
(45) Date of Patent: Nov. 13, 2001

(54) FLAME RETARDANT FOR MESH SHEETS AND FLAMEPROOFED MESH SHEET

(75) Inventors: Saiji Nozaki, 2063, Aimotoshin, Unazuki-machi, Shimoniikawa-gun, Toyama-ken; Kuniaki Kamiya, Osaka, both of (JP)

(73) Assignees: Saiji Nozaki, Toyama; Kyowa Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 09/459,929

(22) Filed: Dec. 14, 1999

(30) Foreign Application Priority Data

Dec. 14, 1998 (JP) .................................. 10-377804

(51) Int. Cl.$^7$ .................................. C08K 3/492
(52) U.S. Cl. ..................... 524/100; 442/136; 442/141; 442/142; 442/143; 442/144; 442/147; 524/80; 524/415; 524/416; 524/436
(58) Field of Search .................... 442/141, 142, 442/143, 144, 136, 147; 524/80, 100, 415, 416

(56) References Cited

U.S. PATENT DOCUMENTS

| 3,943,194 | * | 3/1976 | Dany et al. | 524/80 |
|---|---|---|---|---|
| 3,945,962 | * | 3/1976 | Clark | 524/436 |
| 4,525,409 | * | 6/1985 | Elesh | 428/193 |
| 4,554,003 | * | 11/1985 | Freeport | 71/28 |
| 4,690,859 | * | 9/1987 | Porter et al. | 428/251 |
| 4,769,275 | * | 9/1988 | Inagaki et al. | 428/240 |
| 4,942,086 | * | 7/1990 | Mudge et al. | 428/290 |
| 4,992,481 | * | 2/1991 | Bonin et al. | 521/54 |
| 5,475,041 | * | 12/1995 | Weil et al. | 524/100 |
| 5,498,471 | * | 3/1996 | Hausdorf et al. | 428/290 |
| 5,830,319 | * | 11/1998 | Landin | 428/921 |
| 6,146,557 | * | 11/2000 | Inata et al. | 524/400 |
| 6,150,448 | * | 11/2000 | Nozaki et al. | 524/416 |

* cited by examiner

*Primary Examiner*—Veronica P. Hoke
(74) *Attorney, Agent, or Firm*—Rader, Fishman & Grauer, PLLC

(57) ABSTRACT

A flame retardant composition suitable for mesh sheets comprising 1.5 to 15 parts by weight of red phosphorus, 5 to 50 parts by weight of melamine sulfate, 40 to 150 parts by weight of a metal hydroxide, and a polyolefin-based resin aqueous dispersion having a resin solid content of 25 to 70% by weight. Each of said weights being based upon 100 parts by weight of the solid content of said dispersion.

The present invention in many embodiments does not contain halogen, does not experience a rise in the viscosity of flameproofing agent during storage and provides an excellent effect that the flameproofing component does not elute even when a treated mesh sheet is washed and used repeatedly.

19 Claims, No Drawings

FLAME RETARDANT FOR MESH SHEETS AND FLAMEPROOFED MESH SHEET

BACKGROUND OF THE INVENTION

1. Field of the Invention

The present invention relates to a halogen-free flameproof mesh sheet suitable for being used outdoors such as at a construction work site for a extended period of time, as well as to flame retardant compositions and methods for their manufacture and use.

2. Description of Related Art

In recent years, there has been a trend toward the construction of buildings having a large number of stories in the construction industry. Meanwhile, there has also been an increase in the number of houses having a small number of stories. Different types of flameproof mesh sheets are often used in the construction industry for safety and protection. Flameproof mesh sheets such as those useful for houses having a small number of stories and/or sheets used for scattering prevention must be laid in these buildings and regulations of such sheets are becoming more and more strict.

Currently used flameproof mesh sheets are produced by weaving gray yarn prepared by coating a polyester, nylon or polypropylene multi-filament fiber with a vinyl chloride-based paste resin composition and heating the obtained gray cloth. Alternatively, such sheets are made by coating a woven gray fabric prepared from multi-filament fibers with a vinyl chloride-based paste resin composition. The coated fabric is heated and processed to a desired shape.

Typical resin compositions for coating fibers and fabrics comprise a chlorine containing vinyl chloride resin and a chlorine-based flame retardant such as chlorinated paraffin. It is also possible to employ a brominated flame retardant such as decabromodiphenyl oxide or an inorganic flame retardant such as antimony trioxide (known coating compositions are disclosed, for example, in examined Japanese Patent Publication Nos. 52-41786, 53-18065 and 61-9430, as well as Plastics, February, 1991 which are incorporated by reference in their entireties.

Throughout the world, in recent years, limitations on the use of resins and flame retardants containing halogen which generate harmful gases (such as dioxins and bromine dioxins) at the time of combustion have been put into place from the viewpoint of the environmental preservation of the earth.

It has been proposed in Japanese Laid-open Patent Application No. 10-199406 a flame retardant for mesh sheets which comprises ammonium polyphosphate, as well as a flameproof mesh sheet comprising the same. This invention is halogen free and excellent in terms of no increase in viscosity during storage. However, when the mesh sheet is washed and used repeatedly, a tendency toward the elution of ammonium polyphosphate is seen.

SUMMARY OF THE INVENTION

The present invention provides a halogen-free flame retardant for mesh sheets which has at least a reduced tendency to experience the elution of flameproofing agent when it is used repeatedly, as well as to a flameproof mesh sheet comprising the same.

In accordance with the present invention, there is provided a flame retardant composition suitable for mesh sheets comprising 1.5 to 15 parts by weight of red phosphorus, 5 to 50 parts by weight of melamine sulfate, 40 to 150 parts by weight of a metal hydroxide, and a polyolefin-based resin aqueous dispersion having a resin solid content of 25 to 70% by weight, each of said weights being based upon 100 parts by weight of the solid content of said dispersion.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF A PREFERRED EMBODIMENT

The present invention in many embodiments does not contain halogen, does not experience a rise in the viscosity of flameproofing agent during storage and provides an excellent effect that the flameproofing component does not elute even when a treated mesh sheet is washed and used repeatedly.

The polyolefin-based resin aqueous dispersion of the present invention is advantageously at least one selected from (i) an ethylene vinyl acetate copolymer aqueous dispersion having a resin solid content of 25 to 70 weight % and comprising 15 to 95 weight % of vinyl acetate and the balance comprising (or even consisting of) ethylene, (ii) an ethylene vinyl acetate vinyl versatate copolymer aqueous dispersion having a resin solid content of 30 to 70 weight % and comprising 5 to 35 weight % of ethylene, 30 to 70 weight % of vinyl acetate and 25 to 65 weight % of vinyl versatate, and (iii) an ethylene vinyl acetate acrylate copolymer aqueous dispersion having a resin solid content of 40 to 70 weight % and comprising 5 to 30 weight % of ethylene, 30 to 70 weight % of vinyl acetate and 25 to 65 weight % of an acrylate.

A suitable flame retardant composition for mesh sheets can be prepared by blending a polyurethane aqueous dispersion having a solid content of 25 to 70 weight % with polyolefin-based resin in an amount of 10 to 50 weight % in terms of solid content based on 90 to 50 weight % of the solid content of a copolymer aqueous dispersion. The flame retardant composition for mesh sheets according to the present invention preferably includes red phosphorus is micro-capsulated and the metal hydroxide is magnesium hydroxide and/or aluminum hydroxide.

A suitable flame retardant composition for mesh sheets can also be prepared by including an organic phosphate with the flame retardant composition, the organic phosphate preferably being included in an amount of 3 to 30 parts by weight based on 100 parts by weight of the solid content of the aqueous dispersion resin of the flame retardant composition. The organic phosphate is preferably a halogen-free phosphate.

A flameproof mesh sheet woven out of coated yarn can be produced for example, by impregnating and coating multi-filament fibers with a flame retardant for mesh sheets according to the present invention and heating. The multi-filament fibers advantageously have an equivalent single fineness of 3 to 17 denier, a total fineness of 500 to 4,500 denier, a tensile strength of 4 to 10 g/denier and a break elongation of 14 to 45%. A suitable flameproof mesh sheet can be produced by impregnating and coating a mesh sheet fabric woven out of multi-filament fibers with the flame retardant composition and heating. The mesh sheet fabric woven out of multi-filament fibers can be produced if desired by paralleling 2 to 4 synthetic fibers having an equivalent single fineness of 2 to 17 denier, a total fineness of 150 to 2,500 denier, a tensile strength of 6 to 10 g/denier and a break elongation of 14 to 45%; and weaving an imitation gauge with a loom. The mesh length of the fabric is preferably 10 to 140 warps/10cm and 10 to 140 wefts/10 cm.

If desired the mesh sheet can be impregnated and coated with 60 to 350 parts by weight of the flame retardant composition, based on 100 parts by weight of the multi-filament fibers or the mesh sheet fabric woven out of multi-filament fibers.

Any polyolefin based resin aqueous dispersion or mixtures of dispersion can be used in the present invention. An aqueous dispersion of an ethylene vinyl acetate copolymer an aqueous dispersion of an ethylene vinyl acetate vinyl versatate copolymer and an aqueous dispersion of an ethylene vinyl acetate acrylate copolymer can be advantageously used as a base material (i.e., as the olefin-based resin material) in the present invention. This is because a multi-filament fiber and fabric can be fully impregnated with a flame retardant and/or uniformly coated with the flame retardant when such base materials are employed. The use of an aqueous dispersion typically makes impregnation and coating easy.

A suitable ethylene vinyl acetate copolymer used in the present invention is advantageously a copolymer comprising 15 to 95 weight % of vinyl acetate and the balance comprising of ethylene. A suitable aqueous dispersion of the ethylene vinyl acetate copolymer preferably has a solid content of 25 to 75 weight %, a particle diameter of 0.1 to 15 mm, a viscosity of 50 to 9,000 cp and a pH of 4 to 9, as exemplified for example by V-200 and V100 (of Mitsui Petrochemical Industries, Ltd.), and S-455, S456, S-500, S-480, S-752 and S-753 (of Sumitomo Chemical Co., Ltd.), publically available marketing brochures and/or product literature of which are incorporated herein by reference in their entireties.

A suitable ethylene vinyl acetate vinyl versatate copolymer used in the present invention is advantageously a copolymer comprising 5 to 35 weight % of ethylene, 35 to 70 weight % of vinyl acetate and 25 to 65 weight % of vinyl versatate. The aqueous dispersion of the copolymer preferably has a solid content of 30 to 70 weight %, a particle diameter of 0.1 to 15 mm, a viscosity of 50 to 3,000 cp and a pH of 4 to 9, as exemplified for example by S-950 and S-951 (of Sumitomo Chemical Co., Ltd.) and VL-2 (of Showa Kobunshi Kagaku Co., Ltd.), publically available marketing brochures and/or product literature of which are incorporated herein by reference in their entireties.

A suitable ethylene vinyl acetate acrylate copolymer used in the present invention preferably comprises 5 to 35 weight % of ethylene, 30 to 70 weight % of vinyl acetate and 25 to 65 weight % of an acrylate. The aqueous dispersion of the ethylene vinyl acetate acrylate copolymer preferably has a solid content of 40 to 70 weight %, a particle diameter of 0.1 to 15 mm, a viscosity of 50 to 9,000 cp and a pH of 4 to 9, as exemplified for example by POLIZOLE EF-421 and POLIZOLE EF-221 (of Showa Kobunshi Co., Ltd.), and SUMIFLEX S-900, S-910, S-920 and S-921 (of Sumitomo Chemical Co., Ltd.), publically available marketing brochures and/or product literature of which are incorporated herein by reference in their entireties.

A polyurethane having the main structure of a polyester, polyether or polycarbonate can be advantageously used as the polyurethane. Out of these, a polyurethane having the main structure of a polyester is preferred from the viewpoints of flexibility, water resistance, adhesion and the like.

The polyurethane aqueous dispersion used in the present invention preferably has a solid content of 25 to 70 weight %, a particle diameter of 0.01 to 10 mm, a viscosity of 10 to 3,000 cp and a pH of 4 to 9, as exemplified for example by DESPACOL U-42 and DESPACOL KA8481 (Sumitomo Viel Urethane Co., Ltd.), ADECABONTITER HUX-380; ADECABONTITER HUX-232, ADECABONTITER HUX-290H, ADECABONTITER HUX-3 50 and ADECABONTITER HUX-386H (Asahi Denka Kogyo Co., Ltd.), LETAN WB (Kansai Paint Co., Ltd.), publically available marketing brochures and/or product literature of each of these materials is specifically incorporated herein by reference in its entirety.

A suitable polyurethane dispersion preferably contains a polyolefin resin in an amount of 10 to 50 weight % in terms of solid content based on a total solid content of 90 to 50 weight % of the copolymer dispersion.

Red phosphorus and melamine sulfate are generally used as flame retardants in the present invention. However, other equivalent materials may be substituted if desired for any reason and are contemplated as being within the scope of the present invention. When a resin composition containing red phosphorus is brought close to flames, the resin and red phosphorus on the surface burn first and the resin is bonded to oxygen in the air to form carbon dioxide gas, water and carbon. Thus, the use of red phosphorus promotes the carbonization of the resin (i.e. the ethylene vinyl acetate copolymer). Meanwhile, red phosphorus is bonded to oxygen to become an oxide which is further bonded to water to form condensed phosphoric acid. A film made from a mixture of carbon and condensed phosphoric acid formed on the surface of the resin becomes an oxygen impermeable layer on the surface of the resin, thereby suppressing the combustion of the resin, and making the resin flame resistant.

It is highly advantageous if the red phosphorus is present in an amount of 1.5 to 15 parts by weight based on 100 parts by weight of the solid content of the polyolefin-based resin aqueous dispersion having a solid content of 25 to 70 weight %. That is, if the content of red phosphorus is less than 1.5 or about 1.5 parts by weight based on the resin solid content, its flame retarding effect may not be as readily provided. When the content is more than 15 or about 15 parts by weight, its flame retarding effect may not be improved and any resulting flameproof mesh sheet could have a strong red tint which would be difficult to color, even with a pigment.

When a melamine sulfate compound is present, it thermally decomposes at the time of combustion and generates nitrogen gas, which shuts off oxygen. The melamine sulfate compound promotes the carbonization of the polyolefin-based resin as a dehydrocarbonizing agent and improves a flame retarding effect while it generates nitrogen-containing gas. In the present invention, melamine sulfate is advantageously present in an amount of 5 to 50 parts by weight based on 100 parts by weight of the solid content of the polyolefin-based resin aqueous dispersion having a solid content of 20 to 70%. Below 5 or about 5 parts by weight, a flame retarding effect may not be provided and above 50 or about 50 parts by weight, the flame retarding effect may not be improved.

Any red phosphorus can be used in the present invention. Mixtures of at least one red phosphorus can be used if desired. Red phosphorus used in the present invention is preferably micro capsulated. Use of micro-encapsulated red phosphorus makes it possible to reduce any increase experienced in the viscosity of the aqueous dispersion when red phosphorus is mixed into the olefin-based aqueous dispersion. Further, micro-encapsulated red phosphoruses is desirable for other reasons. For example, often flameproof mesh sheets are detached and washed to remove dirt after being spread at a construction site and used for 4 to 8 months. Such sheets are washed by immersing them in hot water heating at about 40° C. in a solution containing a detergent for several hours. At this point, red phosphorus can be prevented from dissolving in water if it is micro-encapsulated. The concentration of red phosphorus in the micro-capsule is preferably 75 to 95% and the average particle diameter thereof is preferably 10 to 40 mm.

Micro-encapsulation can be suitably carried out by any known method such as by coating the surface of a red phosphorus particle with a resin or inorganic material by interfacial polymerization, coacervation or the like.

NOVA EXCEL 140 or NOVA RED 120 (of Rin Kagaku Kogyo Co.) can be advantageously used as red phosphorus.

APINON 901 (of Sanwa Chemical Co., Ltd.) can be advantageously used as melamine sulfate.

When at least one metal hydroxide is also included in the composition, the flame retarding effect obtained is advantageously increased. The metal hydroxide is preferably magnesium hydroxide or aluminum hydroxide which can be used in conjunction with red phosphorus and melamine sulfate to obtain a greater effect. Since the obtained product may become hard when a metal hydroxide is blended, the optional use of at least one organic phosphate advantageously makes the obtained product softer and minnimizes or even prevents it from becoming hard. The organic phosphate if employed, is advantageously present in an amount of 40 to 150 parts by weight based on 100 parts by weight of the total solid content of the polyolefin-based resin aqueous dispersion.

When the amount of the metal hydroxide is smaller than 40 or about 40 parts by weight based on the resin solid content, its effect of promoting flame retardancy may be reduced, and when the amount is larger than 150 or about 150 parts by weight, the viscosity of the aqueous dispersion of the resin may tend to increase disadvantageously.

A suitable aluminum hydroxide comprises, for example, HIJILITE H-42M or HIJILITE H43M (of Showa Denko K.K.).

A suitable magnesium hydroxide comprises, for example KISUMA 5 (of Kyowa Kagaku Kogyo Co., Ltd.).

At least one melamine sulfate is desirable used in the present invention, melamine sulfate generally does not elute from a mesh sheet containing it when the mesh sheet is washed with water heated at 40° C. and having a pH of 11 or about 11–12 to remove dirt, therefore its flame retarding effect is maintained over a long period of time and its effect in practical application is very large.

The flame retardant composition of the present invention also encompasses a flame retardant optionally containing at least one organic phosphate, preferably in an amount of 3 to 30 parts by weight based on 100 parts by weight of the total resin solid content. When the amount of the organic phosphate is smaller than 3 or about 3 parts by weight, its flame retardancy improving effect may be minimized and the improvements of gloss and flexibility may also be minimized as well. When the amount is larger than 30 or about 30 parts by weight, the improvement of flame retardancy may be small and the product may become disadvantageously sticky.

The organic phosphate, if included, is preferably a halogen-free phosphate having an elemental phosphorus content of 7 to 18 weight % and a viscosity (20° C.) of 10 to 150 cp. The organic phosphate used in the present invention is preferably an aryl phosphate, although any desired organic phosphate or mixtures can be used. The aryl phosphate typically has a good flame retarding effect, possesses high compatibility with resins and also provides a plasticizing effect.

Other flame retardant materials can be included if desired for any reason. In some embodiments, it may be desirable to include only the red phosphorus, the melamine sulfate, the metal hydroxide and optionally the organic phosphate. In some embodiments it may be disadvantageous to include titanium oxide or aluminum polyphosphate.

The amounts of melamine sulfate, organic phosphate, red phosphorus and the like are expressed as parts by weight based on 100 parts by weight of the solid content of the polyolefin-based resin. When a polyolefin-based resin also includes a polyurethane, the above amounts are based on 100 parts by weight of the total resin solid content.

A flame retardant composition of the present invention can be made by any desired method. In one embodiment the composition is prepared by blending the polyolefin-based resin with the red phosphorus, the melamine sulfate and the metal hydroxide to form a composition having the stated weight ratios.

A description is subsequently given of a suitable flameproof mesh sheet comprising the flame retardant of the present invention.

A multi-filament fiber used in the present invention is preferably one or a plurality of multi-filament fibers selected from polyesters, nylons, polypropylene, polyethylene and vinylon. It is preferably a polyester fiber from the viewpoints of strength and thermal shrinkage, however, any desired fiber can be used.

A high-strength and lightweight flameproof mesh sheet can be obtained by any known method such as by controlling the tensile strength of the multi-filament fiber to 4 to 10 g/denier. A flameproof mesh sheet having high toughness and high impact energy absorption can be obtained for example, by controlling the break elongation of the multi-filament fiber to 14 to 45% or about 14 to 45%.

The multi-filament fiber preferably has an equivalent single fineness of 3 to 17 denier, more preferably 3 to 12 denier, particularly preferably 4 to 9 denier and a total fineness preferably of 500 to 4,500 denier, more preferably 1,000 to 3,500 denier, particularly preferably 1,500 to 3,000 denier.

The multi-filament used in a fabric which is woven and then treated with a flame retardant preferably has an equivalent single fineness of 2 to 17 denier, preferably 2 to 11 denier, more particularly preferably 2.5 to 9 denier and a total fineness preferably of 150 to 2,500 denier, more preferably 200 to 2,000 denier, particularly preferably 250 to 1,500 denier. By controlling tensile strength to 4 to 10 gldenier or about 4 to 10 g/denier, a high-strength and lightweight flameproof mesh sheet can be obtained, and by controlling break elongation to 14 to 45% or about 14 to 45%, a flameproof mesh sheet having high toughness and high impact energy absorption can be obtained.

A flameproof mesh sheet which requires high strength and high toughness can be produced by any known method such as by paralleling 2 to 4 filament fibers and weaving a leno weave fabric or imitation gauze out of the fibers with a Dobby weaving machine. A scattering prevention flameproof mesh sheet can be produced by any known method such as by weaving a plain weave fabric out of a single filament fiber with a loom in most cases. A flameproof mesh sheet for houses having a small number of stores can be produced by any known method such as by weaving a plain weave fabric, or a leno weave fabric or imitation gauge after 2 to 4 filament fibers are paralleled. The mesh length is preferably 10 to 140 warps/10 cm and 10 to 140 wefts/10 cm.

The weight ratio of the solid content of the flame retardant to the multi-filament fibers and fabric is 60 to 350 parts by weight based on 100 parts by weight of the multi-filament fibers and fabric. When the solid content of the flame retardant is less than 60 or about 60 parts by weight based on 100 parts by weight of the multi-filament fibers and fabric, coating may become nonuniform, rendering the bases of the multi-filament fibers and fabric partly exposed, thereby deteriorating outer appearance and weatherability. Further, flameproofness may also be reduced. When the solid content is more than 350 or about 350 parts by weight, the weight of the flameproof mesh sheet may increase with the result that handling properties may deteriorate disadvantageously.

One or more of a pigment, dye, plasticizer, ultraviolet absorber, optical stabilizer, antioxidant, stabilizer, coupling agent, diluent, thickening agent, foaming agent, dispersant, defoaming agent, mold preventing agent, alga preventing agent and the like can be used in conjunction with the flame retardant compositions in the present invention by suitably selecting types and amounts thereof as known to those of skill in the art.

A description is subsequently given of a suitable process for producing the flameproof mesh sheet of the present invention. When the flameproof mesh sheet of the present invention is produced using a multi-filament fiber, coated yarn can be prepared by coating the fiber with a flame retardant through a sizing nozzle and gelling by heating is conducted. The material formed is taken up by a winder. This coated yarn taken up by the winder is woven into a fabric by a loom. This fabric is introduced into a heating furnace and heated under conditions suitable for fixing meshes so as to obtain gray cloth.

This gray cloth is cut to a predetermined size, sewed and subjected to eyelet fixing according to known techniques to obtain a halogen-free flameproof mesh sheet.

When the flameproof mesh sheet of the present invention is produced using a fabric, woven gray cloth is obtained by weaving the multi-filament fiber with a Dobby weaving machine. Thereafter, this woven gray cloth is immersed in a tank filled with a flame retardant composition and let pass through the tank. It is then dried with an air blow, introduced into a heating furnace and gelled by heating to obtain coated gray cloth. To increase the amount of the flame retardant coated on the cloth, the cloth can be immersed in and let pass through the tank filled with the flame retardant at least two times to produce coated gray cloth. The gray cloth is cut to a predetermined size, sewed and subjected to eyelet fixing to produce a halogen-free flameproof mesh sheet.

EXAMPLES

The following examples are given to further illustrate the present invention and are not limitations on the scope thereof.

Example 1

60 parts by weight of the SA455 ethylene vinyl acetate copolymer aqueous dispersion (of Sumitomo Chemical Co., Ltd., having a solid content of 50%) and 127 parts by weight of the S-951 ethylene vinyl acetate vinyl versatate copolymer aqueous dispersion (of Sumitomo Chemical Co., Ltd., having a solid content of 55 weight %) were injected into a planetary mixer (capacity of 25 liters), and then 7 parts by weight of the NOVA EXCEL 140 red phosphorus (of Rin Kagaku Co., Ltd.), 20 parts by weight of the APINON 901 melamine sulfate (of Sanwa Chemical Co., Ltd.), 80 parts by weight of the HIJILITE H-42M aluminum hydroxide (of Showa Denko K.K.), 0.8 part by weight of the TINUPIN 327 ultraviolet absorber (of Ciba Geigy Co., Ltd.), 0.8 part by weight of the IRGANOX 1010 antioxidant (of Ciba Geigy Co., Ltd.), 1.0 part by weight of the HALS optical stabilizer (of Ciba Geigy Co., Ltd.), 5 parts by weight of the TIPAQUE C-97 titanium oxide (of Ishihara Sangyo Co., Ltd.) and 30 parts by weight of water were added little by little over 5 minutes under agitation. After addition, these materials were stirred for another 20 minutes. Then, vacuum defoaming was carried out by gradually reducing the pressure to 5 mmHg for about 30 minutes to obtain a flame retardant for mesh sheets having a viscosity of 3,530 cp (a BM type viscometer, rotor V-6, 12 rpm, 25° C.). The flame retardant was charged into a bath, and a polyester multi-filament fiber consisting of 384 filaments and having a total fineness of 1,750 denier, an equivalent single fineness of 4.5 denier, a tensile strength of 8.5 g/denier and a break elongation of 21% was caused to pass through a guide, pinched with a pinch roll, and further caused to pass through a guide roll, the bath of the flame retardant and then a sizing nozzle (diameter of 0.7 mm) to be coated. Thereafter, the obtained strand was heated in a heating furnace at 170° C. and caused to pass through another sizing nozzle (diameter of 0.8 mm) to be coated. The strand was further heated in a heating furnace at 190° C. to produce coated yarn of 3,980 denier. The weight ratio of the flame retardant for coated yarn mesh sheets to the multi-filament fibers was 127/100.

Thereafter, the coated yarn was woven into a mesh plain weave fabric of 52 warps/10 cm and 52 wefts/10 cm with a rapier loom at a speed of 50 cm/min. This fabric was then heated in a heating furnace at 170° C. to thermally fuse intersecting points between the warps and wefts to obtain the flameproof mesh sheet of the present invention. Further, this gray cloth was cut to a width of 190 cm and a length of 520 cm, sewed with a sewing machine and subjected to mesh fixing to obtain a flameproof mesh sheet having a width of 180 cm and a length of 510 cm.

The composition of the flame retardant is shown in Table 1 and the measurement results of the properties of the flameproof mesh sheet treated with the flame retardant are shown in Table 3 and Table 5.

Example 2

A flameproof mesh sheet was obtained in the same manner as in Example 1 except that the amount of the NOVA EXCEL 140 red phosphorus (of Rin Kagaku Co., Ltd.) was changed to 12 parts by weight and 40 parts by weight of the KISUMA 5 magnesium hydroxide (of Kyowa Kagaku Co., Ltd.) was used in place of the HIJILITE H42M aluminum hydroxide.

The composition of the flame retardant is shown in Table 1 and the measurement results of the properties of the flameproof mesh sheet treated with the flame retardant are shown in Table 3 and Table 5.

Example 3

A flameproof mesh sheet was obtained in the same manner as in Example 1 except that the amount of the NOVA EXCEL 140 red phosphorus (of Rin Kagaku Co., Ltd.) was changed to 3 parts by weight, the amount of the APINON 901 melamine sulfate (of Sanwa Chemical Co., Ltd.) was changed to 40 parts by weight, the amount of the HIJILITE H-42M aluminum hydroxide (of Showa Denko K.K.) was changed to 130 parts by weight, 20 parts by weight of the TCP organic phosphate (of Daihachi Kagaku Co., Ltd.) was added and 100 parts by weight of water was added.

The composition of the flame retardant is shown in Table 1 and the measurement results of the properties of the flameproof mesh sheet treated with the flame retardant are shown in Table 3 and Table 5.

Example 4

A flameproof mesh sheet was obtained in the same manner as in Example 1 except that the amount of the APINON 901 melamine sulfate (of Sanwa Chemical Co., Ltd.) was changed to 8 parts by weight and the amount of the HIJILITE H42M aluminum hydroxide (of Showa Denko K.K.) was changed to 120 parts by weight.

The composition of the flame retardant is shown in Table 1 and the measurement results of the properties of the flameproof mesh sheet treated with the flame retardant are shown in Table 3 and Table 5.

Example 5

A flameproof mesh sheet was obtained in the same manner as in Example 1 except that 100 parts by weight of the S-752 ethylene vinyl acetate copolymer aqueous dispersion (of Sumitomo Chemical Co., Ltd., solid content of 50 weight %) was used in place of the S-455 ethylene vinyl acetate copolymer aqueous dispersion, 55 parts by weight of the S-910 ethylene vinyl acetate acrylate copolymer aqueous dispersion (of Sumitomo Chemical Co., Ltd., solid content of 55 weight %) was used in place of the S-951 ethylene vinyl acetate vinyl versatate copolymer aqueous solution and 53 parts by weight of the ADECABONTITER HUX-380 polyurethane aqueous dispersion resin (of Asahi Denka Kogyo Co., Ltd., having the main structure of a polyester, solid content of 38 weight %) was blended and 10 parts by weight of the TCP organic phosphate (of Daihachi Kagaku Co., Ltd.) was added.

The composition of the flame retardant is shown in Table 1 and the properties of the flameproof mesh sheet treated with the flame retardant are shown in Table 3 and Table 5.

Example 6

A flameproof mesh sheet was obtained in the same manner as in Example 1 except that the amount of the S-951 ethylene vinyl acetate vinyl versatate was changed to 73 parts by weight, 79 parts by weight of the ADECABONTI-TER HUX-380 polyurethane aqueous dispersion resin was blended, 7 parts by weight of the NOVA RED-120 red phosphorus (of Rin Kagaku Co., Ltd.) was used in place of the NOVA EXCEL 140 red phosphorus, and 5 parts by weight of the TOP organic phosphate (of Daihachi Kagaku Co., Ltd.) was added.

The composition of the flame retardant is shown in Table 2 and the measurement results of the properties of the flameproof mesh sheet treated with the flame retardant are shown in Table 4 and Table 6.

Example 7

An imitation gauze fabric of 45 warps/10 cm and 45 wefts/10 cm was woven with a Dobby weaving machine by paralleling 3 multi-filament fibers of 750 denier to coat the fabric with the same flame retardant for mesh sheets as in Example 1 without using the coated multi-filament fibers in Example 1. The weight of the fabric was 225 g/m$^2$. The composition of the flame retardant is shown in Table 2.

Thereafter, the fabric was caused to pass through a guide roll and a roll coater containing the flame retardant, squeezed with a squeezing roll, dried with an air blow to remove the flame retardant filled in the weave of the fabric, and gelled in a heating furnace having a temperature gradient of 100° C., 150° C. and 160° C., and the coated gray cloth was taken up by a winder. The weight of the coated gray cloth was 504 g/m$^2$ (mesh sheet gray cloth). The gray cloth was cut to a predetermined size, sewed and subjected to mesh fixing to obtain a flameproof mesh sheet. The properties of the mesh sheet are shown in Table 4 and Table 6.

Example 8

A plain weave fabric of 120 warps/10 cm and 120 wefts/10 cm was woven out of multi-filament fibers of 250 denier with a loom without coating the multi-filament fibers with the same flame retardant for mesh sheets as in Example 1 like Example 7. The weight of the fabric was 66 g/m$^2$.

Thereafter, the fabric was coated with the same flame retardant for mesh sheets as in Example 7 in the same manner as in Example 7 and gelled by heating, and the coated gray cloth having a weight of 148 g/m$^2$ was taken up by a winder.

The gray cloth was cut to a predeternmined size, sewed and subjected to mesh fixing to obtain a flameproof mesh sheet suitable for houses having a small number of stories.

The composition of the flame retardant composition used is shown in Table 2 and the measurement results of the properties of the mesh sheet suitable for houses having a small number of stories treated with the flame retardant are shown in Table 4 and Table 6.

Example 9

An imitation gauze fabric of 45 warps/10 cm and 45 wefts/10 cm was woven with a Dobby weaving machine by paralleling 3 multi-filament fibers of 750 denier to coat the fabric with the same flame retardant for mesh sheets as in Example 5 and not the multi-filament fibers like Example 7. The weight of the fabric was 225 g/m$^2$.

Thereafter, the fabric was caused to pass through a guide roll and a roll coater containing the flame retardant composition, squeezed with a squeezing roll, dried with an air blow to remove the flame retardant filled in the weave of the fabric, and gelled in a heating furnace having a temperature gradient of 130° C., 160° C. and 180° C., and the coated gray cloth was taken up by a winder. The weight of the coated gray cloth was 457 g/m$^2$ (mesh sheet gray cloth). The gray cloth was cut to a predetermined size, sewed and subjected to mesh fixing to obtain a flameproof mesh sheet. The properties of the mesh sheet are shown in Table 4 and Table 6.

Example 10

A plain weave fabric of 120 warps/10 cm and 120 wefts/10 cm was woven out of multi-filament fibers of 250 denier with a loom without coating the multi-filament fibers with the same flame retardant for mesh sheets as in Example 5 like Example 8. The weight of the fabric was 66 g/m$^2$.

Thereafter, the fabric was coated with the same flame retardant composition for mesh sheets as in Example 5 in the same manner as in Example 8 and gelled by heating, and the coated gray cloth having a weight of 135 g/m² was taken up by a winder.

The gray cloth was cut to a predetermined size, sewed and subjected to mesh fixing to obtain a flameproof mesh sheet suitable for houses having a small number of stories.

The composition of the flame retardant used is shown in Table 2 and the measurement results of the properties of the mesh sheet for houses having a small number of stories treated with the flame retardant are shown in Table 4 and Table 6.

Comparative Example 1

A flame retardant having a viscosity of 3,470 cps was obtained in the same manner as in Example 1 except that the amount of the NOVA EXCEL 140 red phosphorus was changed to 1.0 part by weight. A flameproof mesh sheet was produced in the same manner as in Example 1 except that the above flame retardant composition was used.

The composition of the flame retardant composition is shown in Table 7 and the measurement results of the properties of the flameproof mesh sheet treated with the flame retardant are shown in Table 9 and Table 11.

Comparative Example 2

A flame retardant having a viscosity of 3,650 cps was obtained in the same manner as in Example 1 except that the amount of the NOVA EXCEL 140 red phosphorus was changed to 20 parts by weight and 10 parts by weight of the TIPAQUE C-97 titanium oxide was added. A flameproof mesh sheet was produced in the same manner as in Example 1 except that the above flame retardant was used.

The composition of the flame retardant is shown in Table 7 and the measurement results of the properties of the flameproof mesh sheet treated with the flame retardant are shown in Table 9 and Table 11.

Comparative Example 3

A flame retardant having a viscosity of 2,980 cps was obtained in the same manner as in Example 1 except that the amount of the APINON 901 melamine sulfate was changed to 3 parts by weight. A flameproof mesh sheet was produced in the same manner as in Example 1 except that the above flame retardant was used.

The composition of the flame retardant is shown in Table 7 and the measurement results of the properties of the flameproof mesh sheet treated with the flame retardant are shown in Table 9 and Table 11.

Comparative Example 4

A flame retardant was to be obtained in the same manner as in Example 1 except that the amount of the NOVA EXCEL 140 red phosphorus was changed to 3 parts by weight, the amount of the APINON 901 melamine sulfate was changed to 60 parts by weight and the amount of water was changed to 100 parts by weight. However, viscosity increased gradually during the agitation of the planetary mixer and the aqueous dispersion became a round mass, whereby agitation became impossible and viscosity could not be measured. Multi-filament fibers could not be coated.

Comparative Example 5

A flame retardant having a viscosity of 3,210 cps was obtained in the same manner as in Example 1 except that the amount of the NOVA EXCEL 140 red phosphorus was changed to 3 parts by weight and the amount of aluminum hydroxide was changed to 30 parts by weight. A flameproof mesh sheet was produced in the same manner as in Example 1 except that the above flame retardant was used.

The composition of the flame retardant is shown in Table 8 and the measurement results of the properties of the flameproof mesh sheet treated with the flame retardant are shown in Table 10 and Table 12.

Comparative Example 6

A flame retardant having a viscosity of 5,670 cps was obtained in the same manner as in Example 1 except that 3 parts by weight of the NOVA EXCEL 140 red phosphorus, 160 parts by weight of the HIJILITE H-42M aluminum hydroxide and 20 parts by weight of the TCP organic phosphate were added. A flameproof mesh sheet was produced in the same manner as in Example 1 except that the above flame retardant was used.

The composition of the flame retardant is shown in Table 8 and the measurement results of the properties of the flameproof mesh sheet treated with the flame retardant are shown in Table 10 and Table 12.

Comparative Example 7

A flame retardant having a viscosity of 3,240 cps was obtained in the same manner as in Example 1 except that 20 parts by weight of the TERR U C-60 aluminum polyphosphate (of Chisso Corporation) was added in place of the APINON 901 melamine sulfate. A flameproof mesh sheet was produced in the same manner as in Example 1 except that the above flame retardant was used.

The composition of the flame retardant is shown in Table 8 and the measurement results of the properties of the flameproof mesh sheet treated with the flame retardant are shown in Table 10 and Table 12.

Comparative Example 8

A flame retardant having a viscosity of 3,340 cps was obtained in the same manner as in Example 1 except that 40 parts by weight of the TERRAJU C-60 aluminum polyphosphate (of Chisso Corporation) was added in place of the APINON 901 melamine sulfate, and 3 parts by weight of the Nova Excel 140 red phosphorus and 130 parts by weight of the HIJILITE H-42M aluminum hydroxide were added. A flameproof mesh sheet was produced in the same manner as in Example 1 except that the above flame retardant was used.

The composition of the flame retardant is shown in Table 8 and the measurement results of the properties of the flameproof mesh sheet treated with the flame retardant are shown in Table 10 and Table 12.

Melamine sulfate had excellent affinity with the ethylene vinyl acetate copolymer, ethylene vinyl acetate vinyl versatate copolymer and ethylene vinyl acetate acrylate copolymer and does not elute when it was immersed in hot water. Therefore, when a flameproof mesh sheet containing melamine sulfate is immersed in and washed with hot water containing a detergent to remove dirt, flame resistance is not decreased. Accordingly, melamine sulfate is a flame retardant suitable for the production of a flameproof mesh sheet which can retain excellent flame retardancy.

The flameproof mesh sheet is washed and used repeatedly.

TABLE 1

|  | Solid Content % | Example 1 | Example 2 | Example 3 | Example 4 | Example 5 |
|---|---|---|---|---|---|---|
| aqueous dispersion resin ethylene vinyl acetate copolymer |  |  |  |  |  |  |
| S-455 | 50 | 60 | 60 | 60 | 60 |  |
| S-752 | 50 |  |  |  |  | 100 |
| ethylene vinyl acetate vinyl versatate copolymer S-951 | 55 | 127 | 127 | 127 | 127 |  |
| ethylene vinyl acetate acrylic ester copolymer S-910 | 55 |  |  |  |  | 55 |
| polyurethane ADECABONTITER HUX-380 | 38 |  |  |  |  | 53 |
| aqueous dispersion resin solid content (parts by weight) |  | 100 | 100 | 100 | 100 | 100 |
| titanium oxide TIPAQUE C-97 |  | 5 | 5 | 5 | 5 | 5 |
| red phosphorus (NOVA EXCEL) 140 |  | 7 | 12 | 3 | 7 | 7 |
| red phosphorus (NOVA RED) 120 |  |  |  |  |  |  |
| melamine sulfate APINON 901 |  | 20 | 20 | 40 | 8 | 20 |
| aluminum hydroxide |  | 80 |  | 130 | 120 | 80 |
| magnesium hydroxide |  |  |  | 40 |  |  |
| organic phosphate TCP |  |  |  | 20 |  | 10 |
| organic phosphate TOP |  |  |  |  |  |  |
| magnesium polyphosphate C-60 |  |  |  |  |  |  |
| water |  | 30 | 30 | 100 | 30 | 30 |
| viscosity of flame retardant for mesh sheets (CPS) |  | 3530 | 2970 | 8110 | 3840 | 2450 |

TABLE 2

|  | Example 6 | Example 7 | Example 8 | Example 9 | Example 10 |
|---|---|---|---|---|---|
| aqueous dispersion resin ethylene vinyl acetate copolymer |  |  |  |  |  |
| S-455 | 60 | 60 | 60 |  |  |
| S-752 |  |  |  | 100 | 100 |
| ethylene vinyl acetate vinyl versatate copolymer S-951 | 73 | 127 | 127 |  |  |
| ethylene vinyl acetate acrylic ester copolymer S-910 |  |  |  | 55 | 55 |
| polyurethane ADECABONTITIER HWX-380 | 79 |  |  | 53 | 53 |
| aqueous dispersion resin solid content (parts by weight) | 100 | 100 | 100 | 100 | 100 |
| titanium oxide TIPAQUE C-97 | 5 | 5 | 5 | 5 | 5 |
| red phosphorus (NOVA EXCEL) 140 |  | 7 | 7 | 7 | 7 |
| red phosphorus (NOVA RED) 120 | 7 |  |  |  |  |
| melamine sulfate APINON 901 | 20 | 20 | 20 | 20 | 20 |
| aluminum hydroxide | 80 | 80 | 80 | 80 | 80 |
| magnesium hydroxide |  |  |  |  |  |
| organic phosphate TCP |  |  |  | 10 | 10 |
| organic phosphate TOP |  |  |  |  |  |
| magnesium polyphosphate C-60 |  |  |  |  |  |
| water | 30 | 30 | 30 | 30 | 30 |
| viscosity of flame retardant for mesh sheets (CPS) | 3260 | 3530 | 3530 | 2450 | 2450 |

TABLE 3

|  | Solid Content % | Example 1 | Example 2 | Example 3 | Example 4 | Example 5 |
|---|---|---|---|---|---|---|
| fineness of multi-filament fiber (De) fabric |  | 1750 | 2500 | 1750 | 1750 | 1500 |
| number of wefts/10/cm |  | 52 | 33 | 52 | 52 | 25 |
| number of warps/10 cm |  | 52 | 33 | 52 | 52 | 25 |
| weight of fabric (g/m$^2$) |  |  |  |  |  |  |

TABLE 3-continued

|  | Solid Content % | Example 1 | Example 2 | Example 3 | Example 4 | Example 5 |
|---|---|---|---|---|---|---|
| weight of coated fabric (g/m$^2$) | | | | | | |
| fineness of coated yarn (De) | | 3980 | 4620 | 7440 | 4350 | 3260 |
| flame retardant for mesh sheets/ multi-filament fiber or fabric | | 127/100 | 93/100 | 325/100 | 149/100 | 117/100 |
| weight of sample piece before test (g/m$^2$) | | 460 | 354 | 868 | 503 | 181 |
| weight change rate (%) | | | | | | |
| one time of immersion | | 0 | 0 | 0 | 0 | 0 |
| two times of immersion | | 0 | 0 | −0.6 | 0 | 0 |
| three times of immersion | | 0 | 0 | −1.0 | 0 | −0.5 |
| weight of sample piece after three times of immersion (g/m$^2$) | | 460 | 354 | 860 | 503 | 181 |
| combustion test | | | | | | |
| test method | | A-2 | A-2 | A-2 | A-2 | A-1 |
| product before immersion | | 3 | 3 | 3 | 3 | 3 |
| product after one time of immersion | | 3 | 3 | 3 | 3 | 3 |
| product after two times of immersion | | 3 | 3 | 3 | 3 | 3 |
| product after three times of immersion | | 3 | 3 | 3 | 3 | 3 |
| test method | | D | D | D | D | D |
| product before immersion | | 2 | 2 | 2 | 2 | 2 |
| product after one time of immersion | | 2 | 2 | 2 | 2 | 2 |
| product after two times of immersion | | 2 | 2 | 2 | 2 | 2 |
| product after three times of immersion | | 2 | 2 | 2 | 2 | 2 |

TABLE 4

|  | Example 6 | Example 7 | Example 8 | Example 9 | Example 10 |
|---|---|---|---|---|---|
| firmness of multi-filament fiber (De) | 1750 | | | | |
| fabric | | | | | |
| number of wefts/10 cm | 52 | 45 | 120 | 45 | 120 |
| number of warps/10 cm | 52 | 45 | 120 | 45 | 120 |
| weight of fabric (g/m$^2$) | | 225 | 64 | 325 | 66 |
| weight of coated fabric (g/m$^2$) | | 504 | 148 | 457 | 135 |
| fineness of coated yarn (De) | 3810 | | | | |
| flame retardant for resin sheets/ multi-filament fiber or fabric | 128/100 | 124/100 | 124/100 | 103/100 | 105/100 |
| weight of sample piece before test (g/m$^2$) | 440 | 504 | 146 | 460 | 136 |
| weight change rate (%) | | | | | |
| one time of immersion | 0 | 0 | 0 | 0 | 0 |
| two times of immersion | 0 | 0 | 0 | 0 | 0 |
| three times of immersion | 0 | 0 | 0 | −0.6 | −0.7 |
| weight of sample piece after three times of immersion (g/m$^1$) | 440 | 504 | 148 | 457 | 135 |
| combustion test | 1 | 1 | 1 | 1 | 0 |
| test method | A-1 | A-2 | A-1 | A-2 | A-1 |
| product before immersion | 3 | 3 | 3 | 3 | 3 |
| product after one time of immersion | 3 | 3 | 3 | 3 | 3 |
| product after two times of immersion | 3 | 3 | 3 | 3 | 3 |
| product after three times of immersion | 3 | 3 | 3 | 3 | 3 |
| test method | D | D | D | D | D |
| product before immersion | 2 | 2 | 2 | 2 | 2 |
| product after one time of immersion | 2 | 2 | 2 | 2 | 2 |
| product after two times of immersion | 2 | 2 | 2 | 2 | 2 |
| product after three times of immersion | 2 | 2 | 2 | 2 | 2 |

TABLE 5

|  | Solid Content % | Example 1 | Example 2 | Example 3 | Example 4 | Example 5 |
|---|---|---|---|---|---|---|
| tensile strength (warp/weft) (Kg/3 cm) | | 215/213 | 205/201 | 210/207 | 212/208 | 110/107 |
| tensile elongation (warp/weft) (Kg/3 cm) | | 24/25 | 24/25 | 22/24 | 23/23 | 22/23 |
| toughness (warp/weft) (Kg/3 cm) | | 10820/10450 | 9840/10452 | 9240/9936 | 9752/9568 | 4840/4922 |
| drop impact strength (penetration test) | | 7 | 6 | 6 | 7 | 4 |
| amount of gas generated (mg/g) | | | | | | |
| hydrochloric acid gas (HCl) | | 0 | 0 | 0 | 0 | 0 |
| bromine gas (HBr) | | 0 | 0 | 0 | 0 | 0 |

TABLE 5-continued

|  | Solid Content % | Example 1 | Example 2 | Example 3 | Example 4 | Example 5 |
|---|---|---|---|---|---|---|
| hydrofluoric acid gas (HF) |  | 0 | 0 | 0 | 0 | 0 |
| color |  | ○ | D | ⊚ | ○ | ○ |
| feeling |  | ⊚ | ⊚ | ⊚ | ⊚ | ⊚ |

TABLE 6

|  | Example 6 | Example 7 | Example 8 | Example 9 | Example 10 |
|---|---|---|---|---|---|
| tensile strength (warp/weft) (Kg/3 cm) | 212/208 | 220/218 | 68/67 | 224/220 | 72/70 |
| tensile elongation (warp/weft) (Kg/3 cm) | 23/21 | 23/25 | 25/26 | 24/25 | 26/26 |
| toughness (warp/weft) (Kg/3 cm) | 9752/8736 | 10120/10900 | 3400/3484 | 10752/11000 | 3744/3640 |
| drop impact strength (penetration test) m | 6 | 6 | 3 | 6 | 3 |
| amount of gas generated (mg/g) |  |  |  |  |  |
| hydrochloric acid gas (HCl) | 0 | 0 | 0 | 0 | 0 |
| bromine gas (HBr) | 0 | 0 | 0 | 0 | 0 |
| hydrofluoric acid gas (HF) | 0 | 0 | 0 | 0 | 0 |
| color | D | ○ | ○ | ○ | ○ |
| feeling | ⊚ | ⊚ | ⊚ | ⊚ | ⊚ |

TABLE 7

|  | Solid Content % | Comparative Example 1 | Comparative Example 2 | Comparative Example 3 | Comparative Example 4 |
|---|---|---|---|---|---|
| aqueous dispersion resin ethylene vinyl acetate copolymer S-455 | 50 |  | 60 | 60 | 60 | 60 |
| S-752 | 50 |  |  |  |  |
| ethylene vinyl acetate vinyl versatate copolymer S-951 | 55 | 127 | 127 | 127 | 127 |
| ethylene vinyl acetate acrylic ester copolymer S-910 | 55 |  |  |  |  |
| polyurethane ADECABONTITER HUX-380 | 38 |  |  |  |  |
| aqueous dispersion resin solid content (parts by weight) |  | 100 | 100 | 100 | 100 |
| titanium oxide TIPAQUE C-97 |  | 5 | 10 | 5 | 5 |
| red phosphorus (NOVA EXCEL) 140 |  | 1 | 20 | 7 | 3 |
| red phosphorus (NOVA RED) 120 |  |  |  |  |  |
| melamine sulfate APINON 901 |  | 20 | 20 | 3 | 60 |
| aluminum hydroxide |  | 80 | 80 | 80 | 80 |
| magnesium hydroxide |  |  |  |  |  |
| organic phosphate TCP |  |  |  |  |  |
| organic phosphate TOP |  |  |  |  |  |
| magnesium polyphosphate C-60 |  |  |  |  |  |
| water |  | 30 | 30 | 30 | 100 |
| viscosity of flame retardant for mesh sheets (CPS) |  | 3470 | 3650 | 2980 | could not be measured |

TABLE 8

|  | Comparative Example 5 | Comparative Example 6 | Comparative Example 7 | Comparative Example 8 |
|---|---|---|---|---|
| aqueous dispersion resin ethylene vinyl acetate copolymer S-455 | 60 | 60 | 60 | 60 |
| S-752 |  |  |  |  |
| ethylene vinyl acetate vinyl versatate copolymer S-951 | 127 | 127 | 127 | 127 |
| ethylene vinyl acetate acrylic ester copolymer S-910 |  |  |  |  |
| polyurethane ADECABONTITER HUX-380 |  |  |  |  |
| aqueous dispersion resin solid content (parts by weight) | 100 | 100 | 100 | 100 |
| titanium oxide TIPAQUE C-97 | 5 | 5 | 5 | 5 |
| red phosphorus (NOVA EXCEL) 140 | 3 | 3 | 7 | 3 |
| red phosphorus (NOVA RED) 120 |  |  |  |  |
| melamine sulfate APINON 901 | 20 | 20 |  |  |
| aluminum hydroxide | 30 | 160 | 80 | 130 |
| magnesium hydroxide |  |  |  |  |
| organic phosphate TCP |  | 20 |  | 10 |
| organic phosphate TOP |  |  |  |  |
| magnesium polyphosphate C-60 |  |  | 20 | 40 |
| water | 30 | 30 | 30 | 30 |
| viscosity of flame retardant for mesh sheets (CPS) | 3210 | 5670 | 3240 | 3340 |

TABLE 9

|  | Comparative Example 1 | Comparative Example 2 | Comparative Example 3 | Comparative Example 4 |
|---|---|---|---|---|
| fineness of multi-filament fiber (De) | 1750 | 1750 | 2750 | — |
| fabric |  |  |  |  |
| number of wefts/10 cm | 52 | 52 | 52 | — |
| number of warps/10 cm | 52 | 52 | 52 | — |

TABLE 9-continued

|  | Comparative Example 1 | Comparative Example 2 | Comparative Example 3 | Comparative Example 4 |
|---|---|---|---|---|
| weight of fabric (g/m$^2$) |  |  |  |  |
| weight of coated fabric (g/m$^2$) |  |  |  |  |
| fineness of coated yarn (De) | 3880 | 4050 | 3750 | — |
| flame retardant for mesh sheets/multi-filament fiber or fabric | 122/100 | 131/100 | 114/100 | — |
| weight of sample piece before test (g/m$^2$) | 448 | 468 | 435 | — |
| weight change rate (%) |  |  |  |  |
| one time of immersion | 0 | 0 | 0 | — |
| two times of immersion | 0 | 0 | 0 | — |
| three times of immersion | 0 | 0 | 0 | — |
| weight of sample piece after three times of immersion (g/m$^2$) | 448 | 468 | 435 | — |
| combustion test |  |  |  |  |
| test method | A-1 | A-2 | A-1 | — |
| product before immersion | 1 | 3 | 1 | — |
| product after two times of immersion | — | 3 | — | — |
| product after three times of immersion | — | 3 | — | — |
| test method | D | D | D | — |
| product before immersion | 1 | 2 | 1 | — |
| product after two times of immersion | — | 2 | — | — |
| product after three times of immersion | — | 2 | — | — |

TABLE 10

|  | Comparative Example 5 | Comparative Example 6 | Comparative Example 7 | Comparative Example 8 |
|---|---|---|---|---|
| fineness of multi-filament fiber (De) fabric | 1750 | 1750 | 1750 | 1750 |
| number of wefts/10 cm | 52 | 52 | 52 | 52 |
| number of warps/10 cm | 52 | 52 | 52 | 52 |
| weight of fabric (g/m$^2$) |  |  |  |  |
| weight of coated fabric (g/m$^2$) |  |  |  |  |
| fineness of coated yarn (De) | 3630 | 4750 | 3960 | 4030 |
| flame retardant for mesh sheets/multi-filament fiber or fabric | 107/100 | 171/100 | 126/100 | 130/100 |
| weight of sample piece before test (g/m$^2$) | 370 | 492 | 456 | 486 |
| weight change rate (%) |  |  |  |  |
| one time of immersion | 0 | 0 | 0 | 0 |
| two times of immersion | 0 | 0 | −1.4 | −1.8 |
| three times of immersion | 0 | 0 | −2.2 | −4.0 |
| weight of sample piece after three times of immersion (g/m$^2$) | 370 | 488 | 448 | 467 |
| combustion test |  |  |  |  |
| test method | A-1 | A-2 | A-2 | A-2 |
| product before immersion | 2 | 3 | 3 | 3 |
| product after one time of immersion | 1 | 3 | 3 | 3 |
| product after two times of immersion | — | 3 | 3 | 3 |
| product after three times of immersion | — | 3 | 1 | 1 |
| test method | D | D | D | D |
| product before immersion | 1 | 2 | 2 | 2 |
| product after one time of immersion | — | 2 | 2 | 2 |
| product after two times of immersion | — | 2 | 2 | 2 |
| product after three times of immersion | — | 2 | 1 | 1 |

TABLE 11

|  | Comparative Example 1 | Comparative Example 2 | Comparative Example 3 | Comparative Example 4 |
|---|---|---|---|---|
| tensile strength (warp/weft) (Kg/3 cm) | — | — | — | — |
| tensile elongation (warp/weft) (Kg/3 cm) | — | — | — | — |
| toughness (warp/weft) (Kg cm) | — | — | — | — |
| drop impact strength (penetration test) m | — | — | — | — |
| amount of gas generated (mg/g) |  |  |  |  |
| hydrochloric acid gas (HCl) | — | — | — | — |
| bromine gas (HBr) | — | — | — | — |
| hydrofluoric acid gas (HF) | — | — | — | — |
| color | ◉ | x | ○ | — |
| feeling | ◉ | ◉ | ◉ | — |

TABLE 12

|  | Comparative Example 5 | Comparative Example 6 | Comparative Example 7 | Comparative Example 8 |
|---|---|---|---|---|
| tensile strength (warp/weft) (Kg/3 cm) | — | — | 214/214 | 210/212 |
| tensile elongation (warp/weft) (Kg/3 cm) | — | — | 22/23 | 23/23 |
| toughness (warp/weft) (Kg/3 cm) | — | — | 9416/9844 | 9660/9753 |
| drop impact strength (penetration test) m | — | — | 6 | 6 |
| amount of gas generated (mg/g) |  |  |  |  |
| hydrochloric acid gas (HCl) | — | — | 0 | 0 |
| bromine gas (HBr) | — | — | 0 | 0 |
| hydrofluoric acid gas (HF) | — | — | 0 | 0 |
| color | ◉ | ◉ | ○ | ◉ |
| feeling | ◉ | x | ◉ | ◉ |

MEASUREMENT METHODS OF PROPERTIES

1. Viscosity Measurement Method
   BM type viscometer rotor No. 6, revolution of 12 rpm, 25° C.
2. Combustion Test
   measured in accordance with JIS L-1091
   A-1 method (45° C., micro-burner method)
   A-2 method (45° C., meckel burner method)
   D method (number of times of flame contact)
3. Tensile Strength Test
   measured in accordance with JIS L-1068
4. Analysis of Combustion Gas
   (1) Method of Generating Combustion Gas
     tubular electric fuirnace method: based on JIS K 2541
     combustion temperature: 850±10° C.
     amount of sample: 0.3 g
     quantity of airflow: 1,000 mi/min
   (2) Detection Method
     hydrogen chloride (HCl), hydrogen bromide (HBr), hydrogen fluoride (EF): ion chromatography after treatment based on JIS K 0107
5. Drop Impact Strength (Penetration Test)
   measured in accordance with JIS-8952.
   A steel tube having an outer diameter of 48.6 mm, a thickness of 2.5 mm and a weight of 2.7 kg was used in this test for flameproof mesh sheet for houses having a small number of stories and for scattering prevention flameproof mesh sheet.

6. Water Resistance Test
  (1) test piece
  A sample piece having a diameter of 1 meter and a length of 1 meter is collected from a mesh sheet.
  (2) immersion
  The above sample piece is immersed in hot water heated at 40° C. and maintained at a pH of 12 for 16 hours.
  (3) drying
  The immersed sample piece is dried under blowing air at 70° C. for 1 hour.
  (4) weight change rate: (weight of sample before test)−(weight of sample after test) (%)
  (5) Immersion is carried out 3 times.

| 7. feeling (flexibility) | |
|---|---|
| excellent (soft) | ⊙ |
| good | ○ |
| slightly good | □ |
| slightly bad | ∆ |
| bad (hard) | × |
| 8. color | |
| slightly pink | ⊙ |
| light pink | ○ |
| rather pink | □ |
| pink | ∆ |
| red brown | × |

All JIS standards and other test protocols mentioned herein are specifically incorporated herein by reference in their entireties.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents. The priority document JP 10-377804 filed Dec. 14, 1998 is specifically incorporated herein by reference in its entirety.

We claim:

1. A flame retardant composition suitable for mesh sheets comprising:
   1.5 to 15 parts by weight of red phosphorus;
   5 to 50 parts by weight of melamine sulfate;
   40 to 150 parts by weight of a metal hydroxide; and
   a polyolefin-based resin aqueous dispersion having a resin solid content of 25 to 70% by weight; each of said weights being based upon 100 parts by weight of the solid content of said dispersion.

2. A flame retardant composition according to claim 1, wherein the polyolefin-based resin aqueous dispersion is at least one selected from the group consisting of
   (i) an ethylene vinyl acetate copolymer aqueous dispersion having a resin solid content of 25 to 70 weight % and comprising 15 to 95 weight % of vinyl acetate and the balance comprising ethylene,
   (ii) an ethylene vinyl acetate vinyl versatate copolymer aqueous dispersion having a resin solid content of 30 to 70 weight % and comprising 5 to 35 weight % of ethylene, 30 to 70 weight % of vinyl acetate and 25 to 65 weight % of vinyl versatate, and
   (iii) an ethylene vinyl acetate acrylate copolymer aqueous dispersion having a resin solid content of 40 to 70 weight % and comprising 5 to 30 weight % of ethylene, 30 to 70 weight % of vinyl acetate and 25 to 65 weight % of an acrylate.

3. A flame retardant composition according to claim 1, which is prepared by blending a polyurethane aqueous dispersion having a solid content of 25 to 70 weight % with a polyolefin-based resin in an amount of 10 to 50 weight % in terms of solid content to form said polyolefin-based aqueous dispersion, wherein the solid content of said polyolefin-based aqueous dispersion is from 90 to 50 weight %.

4. A flame retardant composition for mesh sheets according to claim 1, wherein said red phosphorus is microcapsulated.

5. The flame retardant composition according to claim 1, wherein the metal hydroxide comprises magnesium hydroxide and/or aluminum hydroxide.

6. A flame retardant composition according to claim 1, further comprising an organic phosphate in an amount of 3 to 30 parts by weight based on 100 parts by weight of the solid content of the aqueous resin dispersion.

7. A flame retardant composition according to claim 6, wherein the organic phosphate comprises a halogen-free phosphate.

8. A flameproof mesh sheet woven out of yarn, wherein said yarn comprises multifilament fibers impregnated and/or coated with a flame retardant composition comprising:
   1.5 to 15 parts by weight of red phosphorus,
   5 to 50 parts by weight of melamine sulfate,
   40 to 150 parts by weight of a metal hydroxide, and
   a polyolefin-based resin aqueous dispersion having a resin solid content of 25 to 70% by weight,
   wherein each of said weights are based upon 100 parts by weight of a solid content of said dispersion, and wherein said fibers are heated after being impregnated.

9. A flameproof mesh sheet of claim 8, wherein the multi-filament fibers have an equivalent single fineness of 3 to 17 denier, a total fineness of 500 to 4,500 denier, a tensile strength of 4 to 10 g/denier and a break elongation of 14 to 45%.

10. A flameproof mesh sheet, which comprises:
    a mesh sheet fabric that is woven out of multi-filament fibers, and is impregnated and/or coated with a flame retardant composition comprising:
    1.5 to 15 parts by weight of red phosphorus,
    5 to 50 parts by weight of melamine sulfate,
    40 to 150 parts by weight of a metal hydroxide, and
    a polyolefin-based resin aqueous dispersion having a resin solid content of 25 to 70% by weight,
    wherein each of said weights are based upon 100 parts by weight of a solid content of said dispersion, and wherein said fibers are heated after being impregnated.

11. A flameproof mesh sheet according to claim 10, wherein the mesh sheet fabric woven out of multi-filament fibers is produced by:
    paralleling 2 to 4 synthetic fibers having an equivalent single fineness of 2 to 17 denier, a total fineness of 150 to 2,500 denier, a tensile strength of 6 to 10 g/denier and a break elongation of 14 to 45%; and
    weaving an imitation gauge with a loom, and wherein the mesh length of the fabric is 10 to 140 warps/10 cm and 10 to 140 wefts/10 cm.

12. A flameproof mesh sheet according to claim 10 which is impregnated and coated with 60 to 350 parts by weight of said flame retardant composition based on 100 parts by weight of the multi-filament fibers or the mesh sheet fabric woven of multi-filament fibers.

13. A method for preparing a flame proof material comprising:
  treating a material with a flame retardant composition comprising:
    1.5 to 15 parts by weight of red phosphorus,
    5 to 50 parts by weight of melamine sulfate,
    40 to 150 parts by weight of a metal hydroxide, and
    a polyolefin-based resin aqueous dispersion having a resin solid content of 25 to 70% by weight,
    wherein each of said weights are based upon 100 parts by weight of a solid content of said dispersion.

14. A method as claimed in claim 13, wherein said treating comprises coating and/or impregnating said material.

15. A method as claimed in claim 13, wherein said material is a sheet.

16. A method as claimed in claim 15, wherein said sheet is a mesh sheet.

17. A method for rendering a material flame resistant comprising treating said material with a flame retardant composition comprising:
  1.5 to 15 parts by weight of red phosphorus,
  5 to 50 parts by weight of melamine sulfate,
  40 to 150 parts by weight of a metal hydroxide, and
  a polyolefin-based resin aqueous dispersion having a resin solid content of 25 to 70% by weight,
  wherein each of said weights are based upon 100 parts by weight of a solid content of said dispersion.

18. A method for the preparation of a flame retardant composition comprising:
  providing 1.5 to 15 parts by weight of red phosphorus;
  providing 5 to 50 parts by weight of melamine sulfate;
  providing 40 to 150 parts by weight of a metal hydroxide,
  providing a polyolefin-based resin aqueous dispersion having a resin solid content of 25 to 70% by weight, and
  mixing said red phosphorous, said melamine sulfate, said metal hydroxide and said polyolefin-based resin aqueous dispersion,
  wherein each of said weights are based upon 100 parts by weight of a solid content of said dispersion.

19. A method as claimed in claim 18, wherein said dispersion is formed in a first step and said red phosphorus, said melamine sulfate and said metal hydroxide are added to said dispersion in one or more subsequent steps.

* * * * *